Feb. 22, 1927.
G. E. MEYERS
1,618,773
SUPPORT FOR MOVING PICTURE CAMERAS AND OTHER INSTRUMENTS
Filed Sept. 4, 1925    3 Sheets-Sheet 1
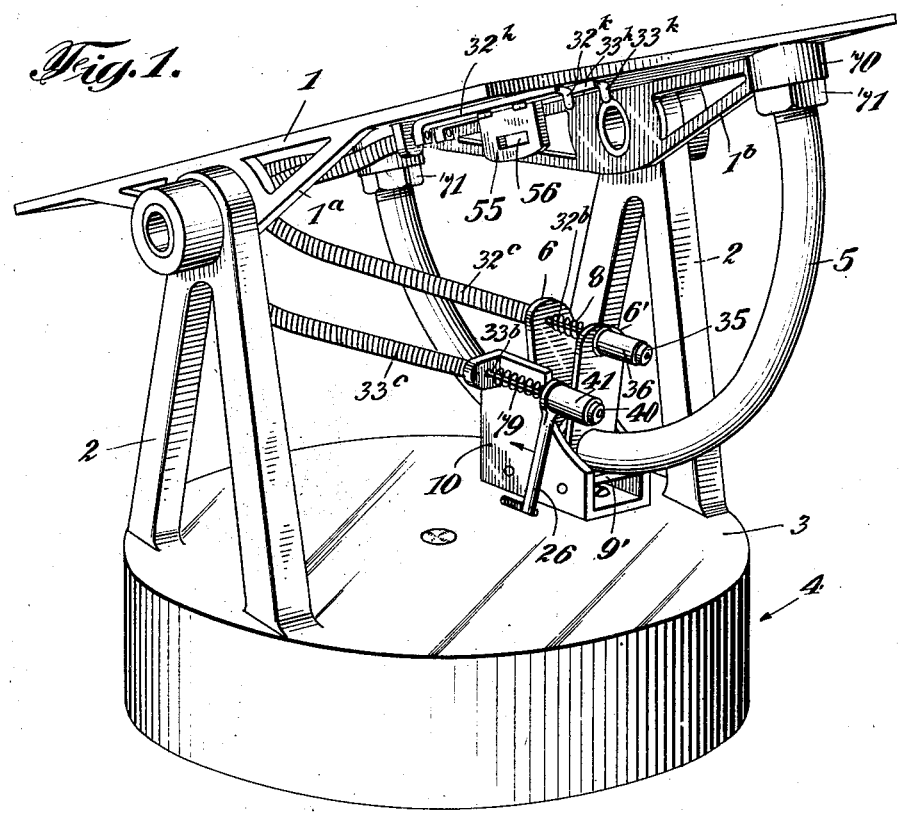
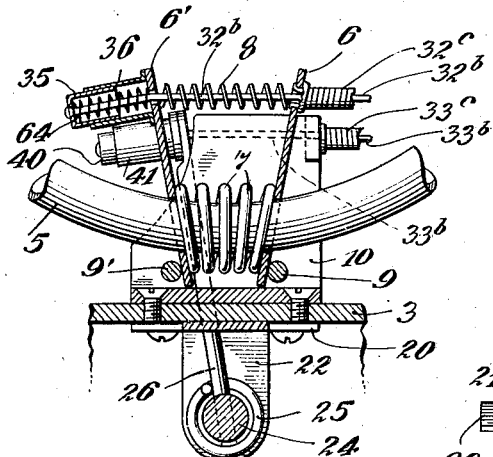
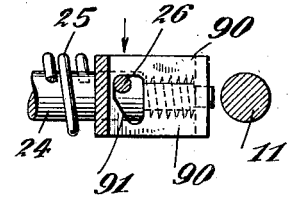
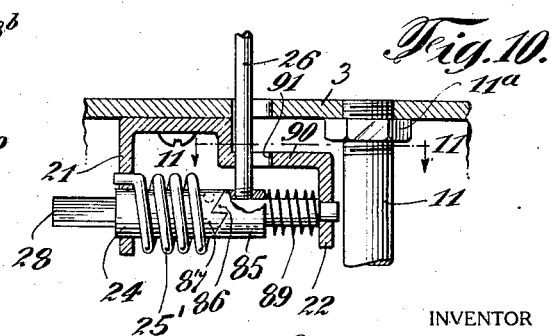
INVENTOR
George E. Meyers
BY
his ATTORNEY

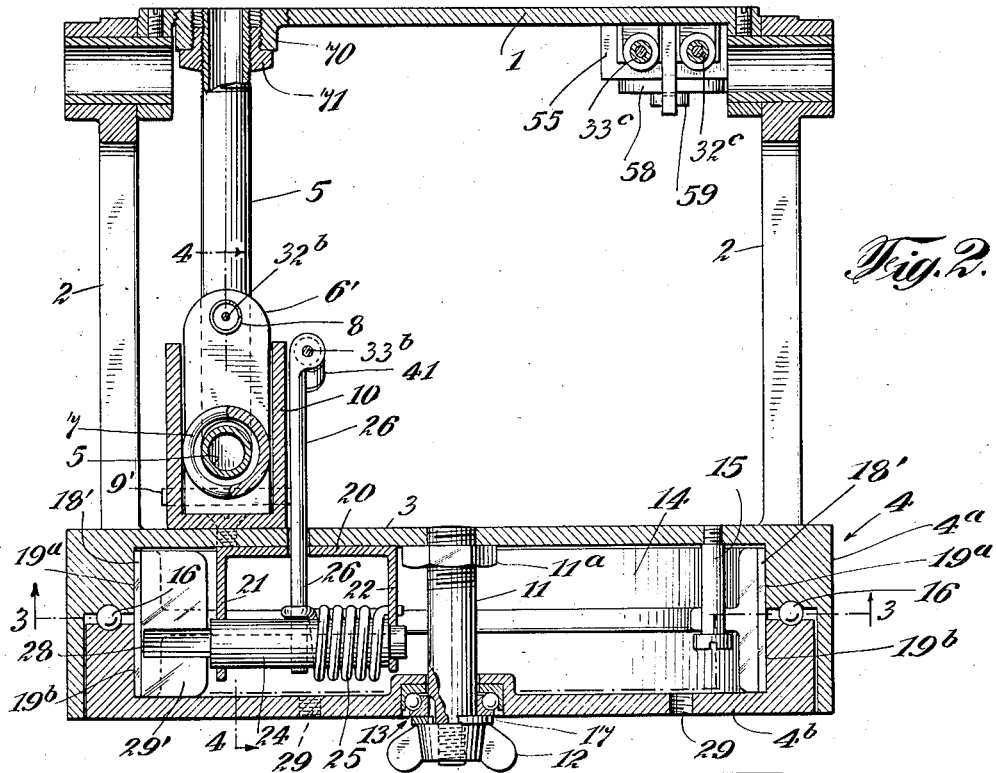

Feb. 22, 1927. 1,618,773
G. E. MEYERS
SUPPORT FOR MOVING PICTURE CAMERAS AND OTHER INSTRUMENTS
Filed Sept. 4, 1925 3 Sheets-Sheet 3
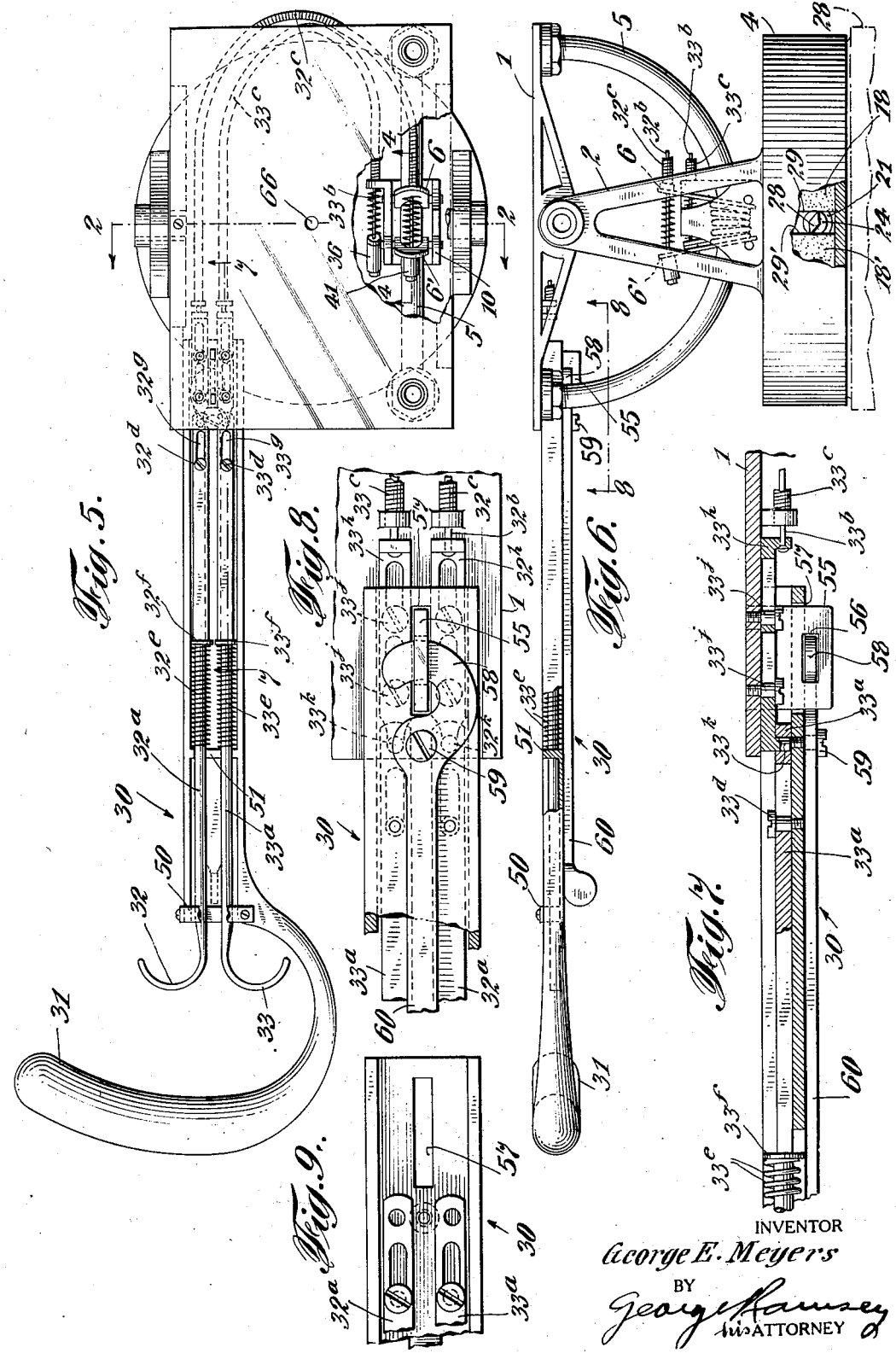
INVENTOR
George E. Meyers
BY
George Ramsey
his ATTORNEY Patented Feb. 22, 1927.

1,618,773

UNITED STATES PATENT OFFICE.

GEORGE E. MEYERS, OF HARTFORD, CONNECTICUT.

SUPPORT FOR MOVING-PICTURE CAMERAS AND OTHER INSTRUMENTS.

Application filed September 4, 1925. Serial No. 54,396.

This invention relates to instrument supports and particularly to supports of the type which permit the supported instrument to be so moved as to point it in practically any desired direction. The invention is particularly useful for supporting motion picture cameras, but is not limited to this particular application.

The most common type of support or tripod head used for motion picture cameras is a device which incorporates a worm driven gear to rotate the camera about a vertical axis and a second worm driven gear or segment which rotates the camera about a horizontal axis. The two worms are driven by separate hand cranks, thus making it necessary for an operator to use both hands to direct the camera in cases where it is required to give the camera a combined horizontal and vertical movement. During picture taking, it is, of course, necessary for an operator to use one hand to operate the camera and hence, in cases where a combined horizontal and vertical movement is required while the picture is being taken, two operators are required.

Heretofore in the art, attempts have been made to devise a supporting device which would permit an operator to simultaneously effect both horizontal and vertical movements of the camera with the use of only one hand, and thus eliminate the necessity of employing two operators. Devices previously suggested have been only partially successful, among other reasons, because the suggested constructions have been such that the camera is not firmly supported, and the mechanisms have considerable lost motion particularly after a substantial period of use. Also the devices of the prior art have not provided satisfactorily controlled means for locking the camera against vertical movement while permitting horizontal movement, and vice versa.

The general object of the present invention is to provide an improved support for moving picture cameras and other instruments which permits the operator to simultaneously effect both horizontal and vertical movements of the instrument under the control of one hand.

Another object of the invention is to provide a support which will firmly and rigidly support an instrument while permitting horizontal and vertical movement under the control of one hand and permitting the instrument to be firmly locked in any desired position.

Another object of the invention is to provide an instrument support which will permit the operator to effect both horizontal and vertical movements of the instrument under the control of one hand and permit him to simultaneously control, with the same hand, means for locking the instrument in any desired position.

Another object of the invention is to provide an instrument support which normally locks the instrument against both horizontal and vertical movement, but which permits the operator to release the locking means and control the movement of the camera in either a horizontal or vertical direction or both, all with the use of one hand.

The above and other objects of the invention are accomplished by means of a construction which will now be generally described. The instrument is mounted upon an instrument supporting plate journalled on a horizontal axis in a supporting frame, which in turn is so mounted as to be rotatable about a vertical axis. Attached to the instrument supporting plate is an arcuate bar or member so positioned that the horizontal axis of the plate passes substantially through the geometrical center of the arc. This arcuate member is engaged by normally set locking means that prevent rotation of the instrument supporting plate about its horizontal axis. The supporting frame in which the instrument supporting plate is journalled is engaged by a normally set brake which prevents rotation of the frame about its axis, which is a vertical one.

Attached to the instrument supporting plate is a projecting handle provided with a pair of trigger devices, one of which is operatively connected to the locking means that prevents rotation on a horizontal axis and the other of which is operatively connected with the brake, which prevents rotation about a vertical axis. In operating the device the operator grasps the grip of the handle with one hand and with the fingers of the same hand he manipulates either or both of the trigger devices. This enables him to release at will the locking means, which prevents rotation of the instrument about a horizontal axis, and the brake, which prevents rotation of the instrument about a vertical axis. Then with the same hand, he so moves the handle as to direct the instrument in any desired direction.

Fig. 1 is a perspective view showing the supporting device per se, with the control handle removed.

Fig. 2 is a vertical section taken in general on the line 2—2 of Fig. 5.

Fig. 3 is a horizontal sectional view, looking from the bottom up, taken approximately on the line 3—3 of Fig. 2.

Fig. 4 is a detail sectional view taken approximately on the line 4—4 of Fig. 2, and showing primarily the means for locking the instrument against vertical movement.

Fig. 5 is a plan view of the entire device.

Fig. 6 is an elevational view, partially in section, showing the device with part of the connection from the trigger devices to the locking means and brake broken away.

Fig. 7 is a detail sectional view taken on the line 7—7 of Fig. 5 and showing quick detachment mechanism used to associate the control handle with the instrument supporting plate.

Fig. 8 is a detail inverted plan view on the line 8—8 of Fig. 6, showing the quick detachment mechanism by which the control handle is attached to the instrument supporting plate.

Fig. 9 is a detail top plan view of the attachment end of the control handle detached from the instrument supporting plate.

Fig. 10 is a detail sectional view showing a modified construction for controlling the brake.

Fig. 11 is a detail sectional view of the modified brake control construction taken on the line 11—11 of Fig. 10.

Reference will first be had particularly to Figs. 1, 2 and 6. An instrument supporting means in the form of a plate 1 is journalled as shown on a horizontal axis in a frame comprising standards 2 which may be formed integral with a hollow cylindrical base designated as a whole by 4. Attached to the instrument supporting plate 1 is an arcuate member 5, which may be made from a rod or tube, and which is mounted in a plane perpendicular to the horizontal axis of the plate 1 with the center of the arc lying as nearly as possible upon the axis of the plate. Cooperating with arcuate member 5 is a pair of apertured locking plates 6 and 6′ each of which is traversed by the arcuate member. As shown more particularly in Fig. 4 the locking plates 6 and 6′ are urged apart by springs 7 and 8, and the amount of separation of the lower ends of the locking plates is limited by stationary pins 9 and 9′ fastened in a frame 10 which is screwed or otherwise secured to the top of base 4. Under the action of the stationary pins and the springs 7 and 8 the locking plates 6 and 6′ are urged into inclined positions as shown in Fig. 4, thus engaging the arcuate member 5 and holding it stationary. This prevents rotation of the instrument supporting plate 1 about its horizontal axis.

Referring to Fig. 2, it is seen that the base 4 comprises an upper part 4ª and a lower part 4ᵇ separated by ball bearings 16 which are adapted to travel in a suitable annular raceway. The two parts of the base are held together by suitable means such as a stud 11 and a winged nut 12. The stud 11 is fastened by a lock nut 11ª to the upper part 4ª of the base and is provided with a suitable ball bearing 13 where it passes through the lower part 4ᵇ of the base. When the upper part of the base is rotated about the lower part the winged nut 12 moves with the upper part and to prevent any undesired tightening or loosening of the winged nut a washer 17 may be provided which has a tongue projecting as shown into a longitudinal slot in stud 11. It is of course understood that the lower base part 4ª is intended to be attached in any suitable manner to any suitable support, as for example, the head 28 of a tripod as indicated in Fig. 6. The attachment may be made by inserting screws into threaded holes 29 shown in Fig. 2.

Referring to Figs. 2, 3 and 6, there is shown within the hollow base 4 a brake of more or less conventional construction which is attached to and carried by the upper part 4ª of the base. As shown in Figs. 2 and 3 this brake comprises a pair of semicircular brake shoes 14 and 14′ which are held to the upper part 4ª of the base 4 by means of a screw 15. When the brake is set it engages the inner cylindrical surface 19ᵇ of the lower base part 4ᵇ, (Fig. 2) thus preventing rotation of the upper base part 4ª with respect to the lower base part 4ᵇ. If desired the brake shoes 14 and 14′ may be covered with suitable brake lining 18 and 18′ which may be cemented, riveted or otherwise secured to the brake shoes. The brake lining may be of such width that it engages only the inner cylindrical surface 19ᵇ of the base part 4ᵇ, but preferably it covers the entire width of the brake, as indicated in Fig. 2, so as to engage surface 19ª of the upper base part 4ª. Any suitable brake material may be used for the lining. A material which has been found satisfactory under certain conditions is a material known under the trade name of micarta.

As shown in Figs. 2 and 3 there is fastened by screws to the top 3 of the upper base part 4ª a metallic shaft support consisting of a flat plate 20 having depending arms 21 and 22 which are provided with apertures to receive a short shaft 24. The shaft is embraced by a coil spring 25 one end of which is fixed to the depending support 22 and the other end of which engages a rod 26 which passes through the shaft 24 and projects upwardly therefrom. This spring is placed in positions under twisted tension so that it tends to rotate the shaft 24 in a counter-clockwise direction looking at the shaft from the left hand end in Figs. 2 and 3 or from the end shown in elevation in Fig. 6. As shown in Figs. 2, 3 and 6, the end of the shaft 24 is formed into a separating cam 28 which, under the action of spring 25, forces apart the ends 29 and 29' of the brake section 14 and 14', thus expanding the brake against the surface 19$^b$ and locking the upper base part 4$^a$ to the lower base part 4$^b$. It is seen that by this arrangement the brake is normally maintained in its set condition by the spring 25, thus locking the upper base part 4$^a$, the standards 2, and the instrument supporting plate 1 against rotation about a vertical axis.

As shown more particularly in Figs. 5 and 6 there is attached to the instrument supporting plate 1 a projecting handle denoted in general by numeral 30 and comprising a hand grip 31 and a pair of triggers 32 and 33. Triggers 32 and 33 are adapted to actuate rods 32$^a$ and 33$^a$ which are slidably mounted in handle 30 and which extend to a position beneath the corner of the instrument supporting plate 1. Operatively connected to rod 32$^a$ is a wire 32$^b$ (Figs. 1, 2, 4, 5 and 6) which passes through locking plates 6 and 6' and has its end riveted or otherwise secured to a hollow plunger 35 movable within a cylinder 36 which is brazed or otherwise secured to locking plate 6'. The purpose of the cylinder and plunger will be described later. A flexible tube 32$^c$ encases wire 32$^b$ and has one end fixedly secured in any suitable manner to locking plate 6 (Figs. 1 and 4) and the other end fixedly secured to the under side of the instrument supporting plate 1, at a point adjacent the end of handle 30, as shown more particularly in Fig. 8.

The operator grasps the grip of the handle 31 and with one finger of the same hand pulls the trigger 32 thus drawing the wire 32$^b$ longitudinally through the tube 32$^c$. The initial movement of the wire 32$^b$ causes the plunger 35 (Fig. 4) to telescope within the cylinder 36 until the inner end of the plunger engages the surface of the locking plate 6'. The further movement of the wire causes the locking plates 6 and 6' to be drawn together against the action of springs 7 and 8, thus terminating the locking engagement between the plates and the arcuate member 5. This leaves the instrument supporting plate 1 free to rotate about its horizontal axis in standards 2, and accordingly, the operator can then move the grip 31 so as to place the instrument supporting plate 1 (and the supported instrument) in any desired vertical position.

Trigger 33 is operatively connected to the brake in the base 4 by a kinematic chain similar to the one just described which is connected to trigger 32. This kinematic chain comprises a flexible tube 32$^c$ traversed by a wire 33$^b$ which is attached as shown in Fig. 4 to hollow plunger 40 that slides into cylinder 41 brazed or otherwise attached to the upper end of rod 26 which projects upwardly from the shaft 24 of the brake mechanism. The operator while holding the grip 31 and drawing the trigger 32 may, with another finger of the same hand, draw the trigger 33 thereby moving the rod 26 of the brake mechanism in the direction of the arrow, (Fig. 1) against the action of brake spring 25 and thus release the brake. The upper base part 4$^a$ is now free to rotate about a vertical axis and hence the instrument supporting plate 1 and the supported instrument may be placed in any desired horizontal position by simply moving the grip 31 in an appropriate direction. It is seen that the arrangement of the grip 31 and the mechanism associated with triggers 32 and 33 is such that the operator with the use of only one hand can selectively release the instrument supporting plate for movement about either a horizontal or vertical axis or both, and then with the same hand control the rotation of the instrument supporting plate about each of its axes to place the instrument in any desired position.

The details of construction of the handle 30 and its attachment to the instrument supporting plate 1 will now be described. Rods 32$^a$ and 33$^a$ which are slidable in guideways in the handle 30, are held in place by means of screws 32$^d$ and 33$^d$ passing through slots 32$^g$ and 33$^g$ and by bridge member 50 which is screwed or otherwise fastened to the handle 30. The arrangement of these two rods is similar and hence only rod 33$^a$ and its associated mechanism will be described. This rod has a cylindrical portion embraced by a coil spring 33$^e$ one end of which engages a stationary abutment 51, and the other end of which engages a washer 33$^f$ which is held by a pin or other suitable means in fixed position upon rod 33$^a$. It is seen that this arrangement is such that the spring 33$^e$ acts to move the rod 33$^a$ in a right hand direction (Fig. 5) when the trigger 32 is released. Rod 33$^a$ is flat where it is traversed by screw 33$^d$ which has a flat head as shown in Fig. 7 and hence the rod is prevented from rotating. To the same end the rod 33$^a$ may be flattened or squared where it passes under guide 50.

Referring particularly to Fig. 7 it will be seen that the end of wire 33$^b$ where it emerges from the tube 33$^c$ is riveted or otherwise secured to a member 33ʰ. This member is slidably mounted upon the under side of the instrument supporting plate 1 by screws 33ʲ that pass through slots in sliding member 33ʰ and are threaded into the instrument supporting plate 1. The left hand end (Fig. 7) of sliding member 33ʰ is formed into a pin 33ᵏ which projects perpendicularly from the member 33ʰ and passes into an aperture in the flat end of trigger bar 33ᵃ. It is seen that sliding member 33ʰ effects an operative connection between trigger bar 33ᵃ and wire 33ᵇ and that the nature of the connection by pin 33ᵏ is such that there is nothing to interfere with the removal of the handling from the instrument supporting plate. The connection between the trigger bar 32ᵃ and its wire 32ᵇ is similar to the one just described, and hence no description of it will be given.

As shown in Figs. 1, 7 and 8 there projects from the lower side of the instrument supporting plate a stud 55 which passes between the sliding connecting devices 32ʰ and 33ʰ. This stud is provided with a slot 56 and passes through a slot 57 (Figs. 8 and 9) in the end of handle 30. Attached to the lower side of handle 30 is a hook 58 (Figs. 6, 7 and 8) capable of rotation about a pivot 59 under the control of a lever 60. As shown in Figs. 7 and 8 the hook 58 passes through the slot 56 in the stud 55 thus locking the handle 30 to the instrument supporting plate 1. When it is desired to remove the handle it is only necessary to swing the lever 60 thus withdrawing the hook from the slot 56 in stud 55 and permitting removal of the handle. The handle is, of course, replaced in position by reverse operations.

As has previously been pointed out, springs 32ᵉ and 33ᵉ tend to maintain the trigger bars 32ᵃ and 33ᵃ in a particular position and hence while the handle is being attached to the instrument supporting plate it is necessary that the studs 32ᵏ and 33ᵏ, which enter the apertures in the ends of rods 32ᵃ and 33ᵃ, must be in a definite position, which corresponds to the position of the ends of these rods. Tilting of the instrument supporting plate 1 causes bending of the flexible tubes 32ᶜ and 33ᶜ with their accompanying wires, which results in a limited slide movement of the wires with respect to the tubes. Action of this sort has a tendency to effect a slight movement of the studs 32ᵏ and 33ᵏ if the plate should happen to be tilted when the handle is detached, with the result that these studs would be placed in positions where they would not readily enter the apertures in the ends of rods 32ᵃ and 33ᵃ. This difficulty is overcome by the piston construction comprising cylinders 36 and 41 which are associated with the other end of the wires 32ᵇ and 33ᵇ as shown in Fig. 4.

Referring to Fig. 4, there is shown within the plunger 35 spring 64 which is a weak spring, but which is sufficiently strong to always maintain wire 32ᵇ pulled to the left (Fig. 4) when the handle 30 is detached from the instrument supporting plate. In other words, this spring acts to maintain stud 32ᵏ in such a position when the handle is detached that the stud will enter the aperture in the end of rod 32ᵃ when the slot 57 in the handle is placed over the stud 55. The position of stud 33ᵏ is similarly taken care of by a spring within the plunger 40. Spring 64 being a very weak spring interferes in no way with the control of locking plates 6 and 6′ but merely allows the plunger 35 to move in and out of cylinder 36 if the instrument supporting plate is tilted while the handle is removed.

Any instrument, such as a moving picture camera, may be attached to the instrument supporting plate in any suitable manner as by means of a bolt passed into the instrument through hole 66 (Fig. 5) in the center of the plate. Frequently the instrument is reasonably heavy and in order to provide sufficient rigidity of the parts and thus firmly hold the instrument, plate 1 is preferably reenforced by integral brace members 1ᵃ and 1ᵇ as shown in Fig. 1.

The arcuate member 5 may be attached to the plate 1 in any suitable manner, such as that shown more particularly in Fig. 2. Integral with the plate 1 is an internally threaded boss 70 adapted to receive a bushing 71 threaded upon the member 5 with threads of the same pitch and direction as the threads of boss 70. The rod 5 is placed in position by screwing on to each of its ends a bushing 71 and then screwing the bushings into the annular boss 70. Since the threads on the rod 5 and on the interior of the boss 70 are of the same pitch no movement of the rod takes place while the bushings 71 are being screwed into the boss 70. It is obviously desirable that the center of the arc upon which member 5 is bent should accurately coincide with the horizontal axis of instrument supporting plate 1. However, accurate coincidences of the center of the arc with the axis is not absolutely essential since locking plates 6 and 6′ are so held in place that they are capable of undergoing a limited amount of vertical movement as the rod 5 passes through them.

In Figs. 10 and 11 there is shown a modified construction for setting and releasing the brake. This modified construction takes the place of the corresponding construction previously described; and for the most part the reference characters used in Figs. 10 and 11 are the same as in the other figures of the drawings. Shaft 24 having cam end 28 which spreads apart the ends of the brake shoes is mounted in depending arms 21 and 22. The right hand end of this shaft (Fig.

10) is of smaller diameter than the remainder of the shaft and has rotatably mounted thereon a collar 85 provided as shown with a plurality of teeth 86 which act as a pawl and engaged ratchet teeth 87 which are formed on the shaft 24. Collar 85 is urged into engagement with ratchet teeth 86 by spring 89 as clearly shown in Fig. 10. Threaded into this collar is the control rod 26 to which is attached the control wire 33b shown in Fig. 1. Shaft 24 is embraced by a coil spring 25′ which has one end fastened to depending arm 21 and the other end suitably fastened to the shaft 24 so as to act to normally set the brake in the same manner as the spring 25 in the form of the device shown in Figs. 1 to 9 inclusive. Control rod 26 passes through an apertured cam plate 90 having a cam surface 91 as shown in Fig. 11. When the trigger 33, (Fig. 5) is drawn, control rod 26 is moved in the direction of the arrow, (Fig. 11). The initial movement of the control rod causes shaft 24 to be rotated against the action of spring 25′ and thus cause release of the brake. Further movement of the trigger brings control rod 26 into engagement with cam surface 91 which causes collar 85 to be moved to the right (Fig. 10) until the operative connection is broken between the pawl teeth 86 and ratchet teeth 87, thus allowing the spring 25′ to set the brake with a snap action. When the trigger is released the operative relationship between pawl teeth 86 and ratchet teeth 87 is restored by the action of spring 89 (Fig. 10) and spring 79 (Fig. 1). This construction is particularly advantageous for the reason that it permits the spring 25′ to set the brake without overcoming the friction of the control wire 33b and the other mechanism connecting the brake with the trigger. In this way the spring sets the brake with a snap action which causes it to quickly and securely lock the mechanism against rotation about a horizontal axis.

Having thus described my invention, what I claim is:—

1. A device of the class described, comprising instrument supporting means rotatable about two axes, a hand grip operable with one hand to control rotation of said instrument supporting means about each of its axes, and means comprising trigger devices associated with the grip to selectively lock said instrument supporting means against rotation about either of its axes.

2. A device of the class described, comprising instrument supporting means movable in at least two directions, means operable with one hand to control the movement of said instrument supporting means in at least two directions, and means controllable with the same hand to selectively lock said instrument supporting means against movement in at least two directions.

3. A device of the class described, comprising instrument supporting means rotatable about two axes which are perpendicular to each other, means operable with one hand to control the rotation of said instrument supporting means about each of its axes, and means controllable with the same hand to selectively lock said instrument supporting means against rotation about either of its axes.

4. A device of the class described, comprising instrument supporting means movable in two directions, means for locking said instrument supporting means against one of its movements, separate means for locking said instrument supporting means against the other of its movements, means operable with one hand to control the movement of said instrument supporting means at times when either of the locking means is released, and means controllable with the same hand to selectively control each of said locking means, said means for controlling the locking means being operable while the hand retains control of the means for controlling the motion of the instrument supporting means.

5. A device of the class described, comprising instrument supporting means rotatable about two axes which are perpendicular to each other, means to lock said instrument supporting means against rotation about one of its axes, separate means to lock said instrument supporting means about the other of its axes, means operable with one hand to control the rotation of said instrument supporting means about each of its axes at times when either of the locking means is released, and means controllable with the same hand to selectively actuate either of said locking means, said means for actuating the locking means being under the control of the operator's hand simultaneously with his control by that hand of the means for controlling the rotation of the instrument supporting means.

6. A device of the class described, comprising an instrument supporting means movable in two directions, normally set locking means for locking said instrument supporting means against one of its movements, separate normally set locking means for locking said instrument supporting means against the other of its movements, means operable with one hand to release either of said locking means selectively, and means controllable with the same hand to control the movement of said instrument supporting means when either of the locking means is released, said means for releasing the locking means and said means for controlling the rotation of the instrument supporting means being simultaneously controllable by an operator with one hand.

7. A device of the class described, comprising instrument supporting means having at least one axis of rotation, means to lock said supporting means against rotation about at least one axis, a projecting handle, said handle comprising means to control the locking means, and means to control the rotation of said instrument supporting means when the locking means is released, and a quick detachment device associating said handle with said instrument supporting means.

8. A device of the class described, comprising instrument supporting means rotatable about two axes which are perpendicular to each other, means to lock said instrument supporting means against rotation about each of its axes, a projecting handle, said handle comprising means to control the locking means and a grip to control the rotation of said instrument supporting means at times when the locking means is released; and a quick detachment device associating said handle with said instrument supporting means.

9. A device of the class described, comprising instrument supporting means rotatable about at least one axis, means to lock said instrument supporting means against rotation about at least one axis, and a handle projecting from said instrument supporting means, said handle comprising a trigger operative to actuate said locking means.

10. A device of the class described, comprising instrument supporting means movable in two directions, means for locking said instrument supporting means against movement, and a handle projecting from said instrument supporting means, said handle comprising a pair of devices one of which is operable to release said instrument supporting means for motion in one direction and the other of which is operable to release said instrument supporting means for motion in the other direction.

11. A device of the class described, comprising instrument supporting means rotatable about at least one axis, means to lock said instrument supporting means against rotation about at least one axis, a handle projecting from said instrument supporting means, said handle comprising a trigger device, and a kinematic chain operatively connecting said trigger with said locking means, there being a quick detachment device to associate said handle with said instrument supporting means and to connect said trigger device with said kinematic chain.

12. A device of the class described, comprising instrument supporting means rotatable about an axis, an arcuate member attached to said instrument supporting means, the center of said arcuate member lying substantially on the axis of rotation of said instrument supporting means, and means coacting with said arcuate member to lock said instrument supporting means against rotation about said axis.

13. A device of the class described, comprising instrument supporting means rotatable about two axes, an arcuate member attached to said instrument supporting means and positioned in a plane perpendicular to one of the axes of rotation, means coacting with said arcuate member to lock said instrument supporting means against rotation about one of its axes, and a brake device operable to lock said instrument supporting means against rotation about the other of its axes.

14. A device of the class described, comprising instrument supporting means rotatable about two axes which are perpendicular to each other, an arcuate member attached to said instrument supporting means and positioned in a plane perpendicular to one of the axes of rotation, locking means adapted to cooperate with said arcuate member, spring means urging said locking means into operative engagement with said arcuate member to lock said instrument supporting means against rotation about one of its axes, a brake device operable to lock said instrument supporting means against rotation about the other of its axes, and spring means to normally maintain said brake in its set position.

15. A device of the class described; comprising instrument supporting means rotatable about an axis; a normally set brake operable to lock said instrument supporting means against rotation about said axis, said brake being set by a spring which at all times urges the brake into its set condition; means to compress the spring to release the brake; and means to release said spring to permit it to set the brake with a snap action.

16. A device of the class described, comprising instrument supporting means rotatable about an axis, a brake operable to lock said instrument supporting means against rotation about said axis, a spring associated with said brake to urge the same into its set condition, a control handle, brake controlling means associated with said control handle, a kinematic chain operatively connecting said brake controlling means with said brake, and means to break said kinematic chain near said spring to permit said spring to set the brake with a snap action without restoring the brake controlling means to its initial position.

17. A device of the class described, comprising instrument supporting means rotatable about an axis, a brake operable to lock said instrument supporting means against rotation about said axis, a spring urging said brake into its set condition, a pawl and ratchet mechanism operable to release said brake against the action of said spring, and means to break the operative connection through said pawl and ratchet mechanism when said mechanism is placed in a predetermined position whereby the spring is released and permitted to set the brake.

18. A device of the class described, comprising instrument supporting means rotatable about an axis, a brake operable to lock said instrument supporting means against rotation about said axis, a spring operable to bias said brake in its set condition, means operable against the action of said spring to release said brake, and means to render said releasing means inoperative when it is placed in a predetermined condition whereby the spring is permitted to set the brake.

19. A device of the class described, comprising instrument supporting means rotatable about an axis, a brake operable to lock said instrument supporting means against rotation about said axis, a spring operative to bias said brake in its set condition, means operative against the action of said spring to release the brake, means to render said releasing means inoperative when it is placed in a predetermined condition to permit the spring to set the brake, and means to restore the releasing means to its operative condition.

GEORGE E. MEYERS.